UNITED STATES PATENT OFFICE.

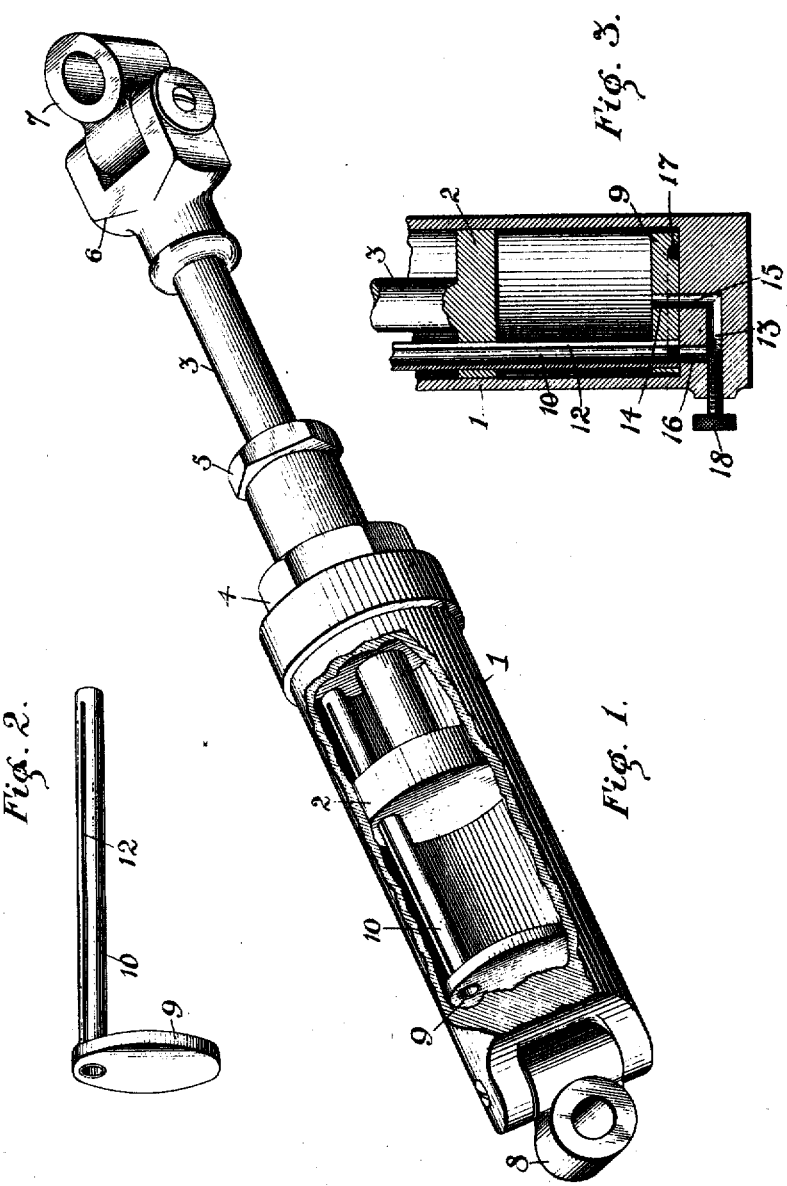

ENOCH RECTOR, OF NEW YORK, N. Y.

SHOCK-ABSORBER.

999,871.  Specification of Letters Patent.  Patented Aug. 8, 1911.

Application filed May 11, 1907. Serial No. 373,164.

*To all whom it may concern:*

Be it known that I, ENOCH RECTOR, a citizen of the United States, and a resident of New York city, in the county of New York and State of New York, have invented a certain new and useful Improvement in Shock-Absorbers, of which the following is a specification.

This invention relates to means for absorbing shock, and is intended more particularly for use on self-propelled vehicles or automobiles though, of course, it may be used wherever a device of the kind is needed or desired.

One object of the invention is to secure more rapid return to normal position of the parts affected by the shock.

Another object is to simplify the construction and improve the operation.

Other objects will appear hereinafter.

The invention consists of features of construction and combinations of devices hereinafter described and more particularly pointed out in the appended claims.

The invention is embodied in the apparatus illustrated in the accompanying drawing, forming part hereof, in which—

Figure 1 is a perspective view, partly broken away, of the assembled device; Fig. 2 is a perspective view of a disk and slotted tube; and Fig. 3 is a sectional view of a modified form.

The reference sign 1 marks a cylindrical shell or the cylinder; 2 designates a piston fitting and working in said cylinder 1, and 3 marks the piston rod connected to said piston 2.

The reference 4 designates a bonnet which screws down on the cylinder 1, and 5 marks the stuffing box or the follower thereof.

6 is a bracket screwing on to the end of the piston rod 3; or it may be otherwise secured to said piston rod. The bracket 6 is pivotally connected with the sleeve 7, and the cylinder 1 is similarly connected with the sleeve 8, the said sleeves 7 8 affording means whereby the device is secured to the parts whose motion toward or from each other it is desired to check, and also forming universal joints at the points of connection.

The piston 2 is perforated to receive the tube 10 with a close but sliding connection. The tube 10 is fast in a hole in a disk 9 which has clearance at its edge between it and the walls of the cylinder 1. The tube 10 is slightly less in length than the inside length of the cylinder 1, and it has a longitudinal slot 12 therein for nearly its whole length. Normally, the disk 9 rests against the end of the cylinder 1, and closes the end of tube 10.

The operation of the above-described device is as follows: The piston 2 normally stands about the middle of the cylinder 1, and when it is forced toward the disk 9, the fluid in the cylinder escapes gradually through the slot 12 and the tube 10 to the other side of the piston, but at a decreasing rate, inasmuch as the effective area of the slot 12 between the piston 2 and the disk 9 is decreasing as the piston moves toward the disk. When the piston returns toward its mid-position, the disk 9 may and usually does move with it until the upper end of the tube 10 strikes the end of the cylinder, or, rather, until there is sufficient clearance between disk 9 and cylinder 1 to allow liquid to flow through tube 10, the liquid flowing around the edges of the disk, and also through the tube, thus adding the area of the tube to the area of the slot 12 that lies between the disk 9 and the piston 2 as passageway for the liquid passing from the space between the piston and the stuffing box to the space between the piston 2 and the disk 9. This large area permits of a relatively quick return of the piston 2 to its mid-position, as when the device is used on an autovehicle and the direct shock is taken when the piston 2 is forced toward the disk 9, and the return of the piston is secured by spring-power. The tube 10 is open at each end, in the preferred arrangement. When the piston 2 is moved from its mid or normal position toward the stuffing box, or away from the disk 9, the end of the tube 10 is quickly closed by coming in contact with the cylinder-head, while the area of the slot 12 between the piston and that cylinder-head decreases, thus increasing the resistance as the piston 2 gets farther and farther from its normal position in this case as in the other case.

In order to adapt one and the same shock-absorber to light and heavy work, a by-pass 13 may be provided in the cylinder 1, and the disk 9 may have a perforation 14 therein which registers with one branch, 15, of said by-pass. In order to insure that the other branch, 16, of the by-pass shall always be in communication with the tube 10, the disk 9 may be provided with a circular groove 17 therein, into which tube 10 opens and which groove is at a distance from the center of the disk 9 equal to the distance of the branch 16 from the center of the cylinder 1. An adjustable screw 18, adapted to vary the opening between the branch 16 and the by-pass 13, is provided, by the movement of which the amount of liquid allowed to pass through the by-pass may be varied at will and even be cut off entirely. The operation of this modified form is apparent from its structure and the above description.

The device may be secured to a sill of the vehicle and to an axle or to a spring by suitable means including bolts or pins which pass through the sleeves 7, 8 and allow of rotation of said sleeves during use, and it is noted that, when used on an auto-vehicle, the axis of the device should be in the resultant of the forces acting.

What I claim as new and desire to secure by Letters Patent of the United States is—

1. In a shock-absorber, the combination of a closed cylinder, a piston therein, a piston-rod connected with said piston, and a split-tube passing through said piston and along which tube said piston may move.

2. In a shock-absorber, the combination of a closed cylinder, a piston therein, a split-tube passing through said piston and along which the piston may move, said tube being shorter than the internal length of the cylinder, and a disk less in diameter than said cylinder and through which said tube passes and to which said tube is fast.

3. In a shock-absorber, the combination of a closed cylinder, a disk therein of less diameter than the cylinder and provided with a perforation, a split tube connected with said disk at and forming a continuation of said perforation, and a piston in said cylinder and provided with a perforation through which said tube passes.

4. In a shock-absorber, the combination of a closed cylinder, a piston-rod passing through one head thereof, a piston in said cylinder, a split tube passing through said piston, a disk in said cylinder at or near the other head thereof and to which said tube is connected, there being a perforation in said disk in line with said tube and also a central perforation in said disk, a by-pass in the cylinder-head for connecting said tube and said central perforation, and means for varying the effective area of said by-pass.

5. In a shock-absorber, the combination of a closed cylinder, a piston-rod passing through one head thereof, a piston in said cylinder, a split tube passing through said piston, a disk in said cylinder at or near the other head thereof and provided with a centrally and an eccentrically located perforation, the latter being in line with said tube, and a by-pass for connecting said perforations.

6. In a shock-absorber, the combination with a cylinder, and a piston therein, of a disk in said cylinder provided with two perforations at least one of which is eccentrically placed and with a circular groove on that face next the adjacent cylinder head and communicating with the eccentrically-placed perforation, a by-pass for connecting said perforations, and a split tube connected with said disk at said eccentrically-placed perforation and passing through said piston.

7. In a shock absorber, the combination of a cylinder, a piston therein, means for actuating said piston, and a slotted tube for conducting liquid from one side of the piston to the other, said tube being adapted to move independently of the movement of the piston.

Signed at New York city in the county of New York and State of New York this tenth day of May, A. D. 1907.

ENOCH RECTOR.

Witnesses:
EMIL L. AARON,
R. W. BARKLEY.